United States Patent [19]

Isobe et al.

[11] Patent Number: 5,527,603
[45] Date of Patent: Jun. 18, 1996

[54] MAGNETIC RECORDING MEDIUM

[75] Inventors: Ryosuke Isobe; Hideaki Wakamatsu, both of Hino, Japan

[73] Assignee: Konica Corporation, Japan

[21] Appl. No.: 129,739

[22] Filed: Sep. 30, 1993

[30] Foreign Application Priority Data

Oct. 13, 1992 [JP] Japan ................................. 4-274676

[51] Int. Cl.⁶ .............................. G11B 5/66; B32B 5/16
[52] U.S. Cl. ...................... 428/323; 428/328; 428/330; 428/336; 428/402; 428/403; 428/694 B; 428/694 BS; 428/694 BN; 428/694 BA; 428/694 BM; 428/900
[58] Field of Search ........................ 428/694 B, 694 BS, 428/694 BN, 694 BA, 694 BM, 402, 403, 900, 323, 328, 330, 336

[56] References Cited

U.S. PATENT DOCUMENTS

| | | | |
|---|---|---|---|
| 4,020,236 | 4/1977 | Aonuma | 428/457 |
| 4,042,341 | 8/1977 | Smeggil | 428/678 |
| 4,696,859 | 9/1987 | Miyoshi | 428/323 |
| 4,956,220 | 9/1990 | Sueyoshi | 428/141 |
| 4,970,124 | 11/1990 | Oltean | 428/570 |
| 5,089,317 | 2/1992 | Noguchi | 428/212 |
| 5,089,331 | 2/1992 | Kyoke | 428/323 |
| 5,089,333 | 2/1992 | Kawahara | 428/329 |

FOREIGN PATENT DOCUMENTS

| | | | |
|---|---|---|---|
| 462820 | 12/1991 | European Pat. Off. | ........ G11B 5/716 |
| 3537624 | 4/1987 | Germany | ........ C01G 49/00 |

OTHER PUBLICATIONS

Patent Abstracts of Japan, vol. 11 No. 42 (p. 545); Feb. 6, 1987 JPA–61–211,815, Sep. 19, 1986.
Patent Abstracts of Japan, vol. 13 No. 78 (E–718); Feb. 22, 1989 JPA–63–260,109; Oct. 27, 1988.
Patent Abstracts of Japan, vol. 13 No. 401 (E–816); Sep. 6, 1989 JPA–1–144,603.
Patent Abstracts of Japan, vol. 14 No. 48 (P–997); Jan. 29, 1990 JPA–1–276,423; Nov. 7, 1989.
Patent Abstracts of Japan, vol. 16 No. 88 (6–1173); Mar. 4, 1992 JPA–3–272,104; Dec. 3, 1991.

*Primary Examiner*—Leszek Kiliman
*Attorney, Agent, or Firm*—Jordan B. Bierman; Bierman and Muserlian

[57] ABSTRACT

There is disclosed a magnetic recording medium comprising an uppermost layer (magnetic layer containing a ferromagnetic metal powder) and the ferromagnetic metal powder containing Fe, Al and one or more rare earth elements selected from the group consisting of Sm, ND, Y and Pr.

The magnetic recording medium has a good electromagnetic converting property and running durability and which is particularly suitable for digital recording media.

8 Claims, No Drawings

MAGNETIC RECORDING MEDIUM

FIELD OF THE INVENTION

The present invention relates to a magnetic recording medium, more specifically a magnetic recording medium which is excellent in electric properties and running durability and which is suitable for analogue recording media and particularly for digital recording media.

BACKGROUND OF THE INVENTION

Traditionally, there have been proposed magnetic recording media of multiple layer structure comprising an upper layer containing a magnetic powder and a lower layer containing a nonmagnetic powder e.g., Japanese Patent Publication Open to Public Inspection (hereinafter referred to as Japanese Patent O.P.I. Publication) Nos. 418/1988 and 191315/1988), aiming at improvement of electromagnetic converting property in the magnetic recording medium.

However, these magnetic recording media are not intended to be applied to digital recording media. Because the upper layer is relatively thick, there is a problem of difficulty in offering a satisfactory electromagnetic converting property and running durability for digital recording media due to a significant loss of layer thickness and spontaneous loss of magnetism, despite the double-layer structure.

Also, in magnetic recording media such as a video tape, because recorded signal depth varies among signals, preference has been given to magnetic recording media of multiple-layer structure comprising magnetic layers containing different magnetic powders suitable to respective signals. However, in producing such a magnetic recording medium of multiple-layer structure, which is normally achieved by multiple-layer coating methods such as the wet-on-wet coating method, there is a problem of electromagnetic converting property deterioration upon tape regeneration because of magnetic layer surface roughness upon coating and drying in some cases according to layer material composition and paint viscosity, etc.

SUMMARY OF THE INVENTION

The object of the present invention is to provide a multiple-layered magnetic recording medium which possesses good electromagnetic converting property and running durability and which is particularly suitable for digital recording media, by solving the above problem to prevent magnetic layer surface roughness in forming a plurality of layers on a nonmagnetic support.

The magnetic recording medium of the invention comprises a nonmagnetic support and an uppermost layer containing a ferromagnetic metal powder formed on the support. The ferromagnetic metal powder contains Fe, Al and one or more rare earth elements selected from the group consisting of Sm, Nd, Y and Pr.

The content ratio in the entire composition of the ferromagnetic metal powder is preferably 2 to 10 parts by weight of Al atoms and 1 to 8 parts by weight of atoms of the rare earth elements per 100 parts by weight of Fe atoms. The content ratio in the surface composition is preferably 70 to 200 parts by number of Al atoms and 0.5 to 30 parts by number of atoms of the rare earth elements per 100 parts by number of Fe atoms.

The ferromagnetic powder of the magnetic recording medium may further contain Na or Ca. In this states the content ratio in the entire composition of the ferromagnetic metal powder is 2 to 10 parts by weight of Al atoms, 1 to 8 parts by weight of atoms of the rare earth elements, not more than 0.1 part by weight of Na atoms and 0.1 to 2 parts by weight of Ca atoms per 100 parts by weight of Fe atoms, and the content ratio in the surface composition is 70 to 200 parts by number of Al atoms, 0.5 to 30 parts by number of atoms of the rare earth element atoms, 2 to 30 parts by number of Na atoms and 5 to 30 parts by number of Ca atoms per 100 parts by number of Fe atoms.

The ferromagnetic powder of the magnetic recording medium may further contain Co, Ni, Si. The content ratio in the entire composition of the ferromagnetic metal powder is 2 to 10 parts by weight of Al atoms, 2 to 20 parts by weight of Co atoms, 2 to 20 parts by weight of Ni atoms, 2 to 10 parts by weight of Al atoms, 0.3 to 5 parts by weight of Si atoms, 1 to 8 parts by weight of atoms of the rare earth elements, not more than 0.1 part by weight of Na atoms and 0.1 to 2 parts by weight of Ca atoms per 100 parts by weight of Fe atoms, and the content ratio in the surface composition is not more than 0.1 part by number of Co atoms, not more than 0.1 part by number of Ni atoms, 70 to 200 parts by number of Al atoms, 20 to 130 parts by number of Si atoms, 0.5 to 30 parts by number of atoms of the rare earth elements, 2 to 30 parts by number of Na atoms and 5 to 30 parts by number of Ca atoms per 100 parts by number of Fe atoms.

The magnetic recording medium preferably has one or more lower layer(s) between the nonmagnetic support and the uppermost magnetic layer.

The thickness of the uppermost magnetic layer is 0.02 to 0.6 μm and the thickness of the lower layer is 0.2 to 2.0μm.

The lower layer has a nonmagnetic layer containing preferably needle-shape nonmagnetic powder.

DETAILED DESCRIPTION OF THE INVENTION

Magnetic recording medium configuration

The magnetic recording medium of the present invention comprises a nonmagnetic support (A) and an uppermost layer (B) (magnetic layer containing a ferromagnetic metal powder) formed thereon, and where necessary a lower layer (C) comprising at least one layer formed between the nonmagnetic support and the uppermost layer.

(A) Nonmagnetic support

Examples of materials for the nonmagnetic support include polyesters such as polyethylene terephthalate and polyethylene 2,6-naphthalate, polyolefins such as polypropylene, cellulose derivatives such as cellulose triacetate and cellulose diacetate, and plastics such as polyamide, aramid resin and polycarbonate.

The nonmagnetic support is not subject to morphological limitation; any form is acceptable, including a tape, film, sheet, card, disc and drum.

The nonmagnetic support is not subject to limitation with respect to thickness; for example, the thickness is normally 2 to 100 μm, preferably 3 to 50 μm for a film or sheet, about 30 mm to 10 mm for a disc or card, and can be set as appropriate according to the recorder etc. for a drum.

The nonmagnetic support may be of a single layer structure or multiple layer structure. The nonmagnetic support may be subjected to a surface treatment such as a corona discharge treatment.

The nonmagnetic support's face on which the above magnetic layer is not formed (back face) is preferably provided with a back-coating layer for purposes such as improvement of the running property of the magnetic recording medium and prevention of charging and transfer. Also, a subbing layer may be formed between the magnetic layer and the nonmagnetic support.

(B) Uppermost magnetic layer

The uppermost magnetic layer contains a magnetic powder. It may also contain a binder and other components as necessary.

The thickness of the uppermost layer is normally 0.01 to 0.7 μm, preferably 0.02 to 0.6 μm, and more preferably 0.02 to 0.4 μm. If the thickness is smaller than 0.01 mm, no sufficient output may be obtained at regeneration because of recording failure. If the thickness exceeds 0.7 μm, no sufficient regeneration output may be obtained due to layer thickness loss.

(B-1) Magnetic powder

In the present invention, the uppermost magnetic layer contains a particular ferromagnetic metal powder as described later as an essential magnetic powder component.

The ferromagnetic metal powder contains Fe, Al and one or more rare earth elements selected from the group consisting of Sm, Nd, Y and Pr.

The ferromagnetic metal powder of the present invention is preferably a ferromagnetic metal powder wherein the content ratio in the entire composition is 2 to 10 parts by weight of Al atoms and 1 to 8 parts by weight of one or more rare earth elements selected from the group consisting of Sm, Nd, Y and Pr per 100 parts by weight of Fe atoms and the content ratio in the surface composition is 70 to 200 parts by number of Al atoms and 0.5 to 30 parts by number of atoms of the rare earth elements per 100 parts by number of Fe atoms.

More preferably, the content ratio in the entire composition of the ferromagnetic metal powder is 2 to 10 parts by weight of Al atoms, 1 to 8 parts by weight of one or more rare earth elements selected from the group consisting of Sm, Nd, Y and Pr, not more than 0.1 part by weight of Na atoms and 0.1 to 2 parts by weight of Ca atoms per 100 parts by weight of Fe atoms, and the content ratio in the surface composition is 70 to 200 parts by number of Al atoms, 0.5 to 30 parts by number of atoms of the rare earth elements, 2 to 30 parts by number of Na atoms and 5 to 30 parts by number of Ca atoms per 100 parts by number of Fe atoms.

Still more preferably, the content ratio in the entire composition of the ferromagnetic metal powder is 2 to 10 parts by weight of Al atoms, 2 to 20 parts by weight of Co atoms, 2 to 20 parts by weight of Ni atoms, 2 to 10 parts by weight of Al atoms, 0.3 to 5 parts by weight of Si atoms, 1 to 8 parts by weight of atoms of one or more rare earth elements selected from the group consisting of Sm, Nd, Y and Pr, not more than 0.1 part by weight of Na atoms and 0.1 to 2 parts by weight of Ca atoms per 100 parts by weight of Fe atoms, and the content ratio in the surface composition is not more than 0.1 part by number of Co atoms, not more than 0.1 part by number of Ni atoms, 70 to 200 parts by number of Al atoms, 20 to 130 parts by number of Si atoms, 0.5 to 30 parts by number of atoms of the rare earth elements, 2 to 30 parts by number of Na atoms and 5 to 30 parts by number of Ca atoms per 100 parts by number of Fe atoms.

Preference is given to a ferromagnetic metal powder wherein the content ratio in the entire composition and that in the surface composition fall within the ranges described above, because it has a high coercive force (Hc) of not lower than 1700 Oe, a high saturation magnetism ($s_s$) of not lower than 120 emu/g and a high dispersibility.

The content of this ferromagnetic metal powder is normally 60 to 95% by weight, preferably 70 to 90% by weight, and more preferably 75 to 85% by weight of the total solid content in the layer.

In the present invention, the magnetic layer may other magnetic powders as described later.

Such other magnetic powders include ferromagnetic iron oxide powders, ferromagnetic metal powders and hexagonal tabular powders.

Of these, the ferromagnetic metal powders can be preferably used.

Examples of the ferromagnetic iron oxide powders include g-$Fe_2O_3$, $Fe_3O_4$, their intermediate iron oxide compounds represented by $FeO_x$ (1.33<x<1.5) and Co-adduct (cobalt-modified) iron oxide compounds represented by Co-$FeO_x$ (1.33<x<1.5).

Examples of such ferromagnetic metal powders include powders based mainly on Fe, Ni or Co such as magnetic powders of Fe-Al alloy, Fe-Al-Ni alloy, Fe-Al-Zn alloy, Fe-Al-Co alloy, Fe-Al-Ca alloy, Fe-Ni alloy, Fe-Ni-Al alloy, Fe-Ni-Co alloy, Fe-Ni-Si-Al-Mn alloy, Fe-Ni-Si-Al-Zn alloy, Fe-Al-Si alloy, Fe-Ni-Zn alloy, Fe-Ni-Mn alloy, Fe-Ni-Si alloy, Fe-Mn-Zn alloy, Fe-Co-Ni-P alloy and Ni-Co alloy. Particularly, Fe-based metal powders are excellent in electric properties.

On the other hand, from the viewpoint of corrosion resistance and dispersibility, preference is given to Fe-Al-based ferromagnetic metal powders such as those of Fe-Al alloy, Fe-Al-Ca alloy, Fe-Al-Ni alloy, Fe-Al-Zn alloy, Fe-Al-Co alloy, Fe-Ni-Si-Al-Co alloy and Fe-Co-Al-Ca alloy.

It is desirable that the ferromagnetic metal powder preferable for the object of the present invention is a Fe-based magnetic metal powder containing Al or Al and Ca in a ratio by weight of Fe:Al=100:0.5 to 100:20, and of Fe:Ca= 100:0.1 to 100:10.

Limiting the Fe:Al ratio within the above range offers marked improvement in corrosion resistance, and limiting the Fe:Ca ratio within the above range offers improvement in electromagnetic converting property, thus reducing dropouts.

Although the mechanism of such improvement in electromagnetic converting property or dropout reduction remains unknown, improved coercive force, a decrease in aggregates, etc. associated with improved dispersibility may result in these desirable aspects.

With respect to these ferromagnetic powders for the present invention, the major axis length is normally not greater than 0.30 μm, preferably 0.04 to 0.20 μm, and more preferably 0.05 to 0.17 μm. Provided that the major axis length falls within this range, the electric properties, as well as surface quality, of the magnetic recording medium can be improved.

Also, the coercive force (Hc) of the ferromagnetic metal powder for the present invention preferably within the range from 600 to 5000 Oe. Coercive forces out of this range are undesirable because electromagnetic converting property can deteriorate at coercive forces of lower than 600 Oe and because recording can fail with ordinary heads at coercive forces exceeding 5000 Oe.

Also, the saturation magnetism ($s_s$), a magnetic property, of the ferromagnetic metal powder is preferably not lower than 70 emu/g in normal cases. If the saturation magnetism is lower than 70 emu/g, electromagnetic converting property can deteriorate. When this ferromagnetic powder is a ferromagnetic metal powder, in particular, the saturation magnetism is desirably not lower than 120 emu/g.

In the present invention, it is preferable to use a ferromagnetic metal powder having a specific surface area of not less than 30 m²/g, particularly not less than 45 m²/g as measured by the BET method, depending on the degree of increase in recording density.

This specific surface area and the method of its measurement are described in detail in "Fine Particle Measurement", edited by J. M. Dallavelle and Clydeorr Jr., translated into Japanese by Muta et al., published by Sangyo Tosho, and are also described in "Kagaku Binran Ooyo Hen", pp. 1170–1171 (edited by the Chemical Society of Japan, published by Maruzen Co., Ltd., Apr. 30, 1966).

Specific surface area is measured by, for example, degassing the subject powder with heat treatment at about 105∞C. for 13 minutes to remove the substances adsorbed thereto, then introducing the powder into the measuring apparatus and carrying out adsorptiometry at a liquid nitrogen temperature (−105° C.) for 10 minutes using nitrogen at an initial pressure of 0.5 kg/m².

The measuring apparatus used was Quantasorb (produced by Yuasa Ionics Co., Ltd.).

The ferromagnetic metal powder preferably has the following structure: The content ratio of Fe atoms and Al atoms in the ferromagnetic metal powder is Fe:Al=100:1 to 100:20 by number of atoms, and the content ratio of Fe atoms and Al atoms distributed in the surface region not deeper than 100 A of ESCA-analyzed depth is Fe:Al=30:70 to 70:30 by number of atoms. In another preferred mode of the ferromagnetic metal powder, Fe atoms, Ni atoms, Al atoms and Si atoms are contained therein, at least either of Co atoms and Ca atoms are contained therein, the Fe atom content is not less than 90 atomic %, the Ni atom content is not less than 1 atomic % and less than 10 atomic %, the Al atom content is not less than 0.1 atomic and less than 5 atomic %, the Si atom content is not less than 0.1 atomic % and less than 5 atomic %, the Co atom content and/or the Ca atom content (total content, in case where both Co and Ca atoms are contained) is not less than 13 atomic %, and the ratio of atoms distributed in the surface region not deeper than 100 A of ESCA-analyzed depth is Fe:Ni:Ai:Si:(Co and/or Ca)= 100:(not more than 4):(10 to 60):(10 to 70):(20 to 80).

In the present invention, the axial ratio b/a of the major axis length (a) of the above ferromagnetic powder contained in the magnetic layer and the major axis length (b) of the nonmagnetic powder contained in the lower nonmagnetic layer is desirably not greater than 3, more desirably not greater than 2.5, and still more desirably not greater than 2. This is because when the axial ratio falls within this range, excellent properties are obtained such as good surface condition of the magnetic recording medium.

The above magnetic powders may be used singly or in combination.

(B-2) Binder

The binder contained in the uppermost magnetic layer is typically exemplified by vinyl chloride resins such as polyurethane, polyester and vinyl chloride copolymers. These resins preferably contain repeat units having at least one polar radical selected from the group consisting of -SO$_3$M, -OSO$_3$M, -COOM, -PO(OM$^1$)$_2$ and sulfobetaine.

With respect to the above polar radicals, M represents a hydrogen atom or an alkali metal such as sodium, potassium or lithium, and M$^1$ represents a hydrogen atom, an atom of an alkali atom such as sodium, potassium or lithium or an alkyl group.

The polar radical described above acts to improve the dispersibility of ferromagnetic powder, and its content in each resin is 0.1 to 8.0 mol. %, preferably 0.2 to 6.0 mol. %. If this content is lower than 0.1 mol. %, the dispersibility of ferromagnetic powder decreases, while if it exceeds 8.0 mol. %, the magnetic coating composition becomes liable to gelation. The weight-average molecular weight of each resin described above is preferably 15000 to 50000.

The binder content in a magnetic layer is normally 8 to 25 parts by weight, preferably 10 to 20 parts by weight to 100 parts by weight of ferromagnetic metal powder.

These binders may be used in combination of two or more kinds as well as singly. In this case, the ratio of polyurethane and/or polyester and vinyl chloride resin is normally 90:10 to 10:90, preferably 70:30 to 30:70 by weight.

The vinyl chloride copolymer containing a polar radical which is used as a binder for the present invention can be synthesized by addition reaction of a copolymer containing a hydroxyl group such as a vinyl chloride-vinyl alcohol copolymer, and one of the following compounds having a polar radical and chlorine atom.

ClCH$_2$CH$_2$SO$_3$M
Cl-CH$_2$CH$_2$OSO$_3$M
Cl-CH$_2$COOM
Cl-CH$_2$-P(=O)OM$^1$)$_2$

Of these compounds, Cl-CH$_2$CH$_2$SO$_3$Na is taken as an example to explain the above reaction.

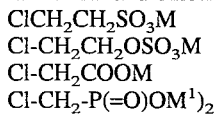

-CH$_2$C(OH)H-+ClCH$_2$CH$_2$SO$_3$Na E -CH$_2$C(OCH$_2$CH$_2$SO$_3$Na)H-

It is also possible to obtain the desired vinyl chloride copolymer containing a polar radical by injecting into a reactor such as an autoclave a given amount of a reactive monomer having an unsaturated bond to introduce a repeat unit containing a polar radical thereto, and using an ordinary polymerization initiator, e.g., a radical polymerization initiator such as BPO (benzoyl peroxide) or AIBN (azobisisobutyronitrile), a redox polymerization initiator or a cationic polymerization initiator.

Examples of the reactive monomer to introduce sulfonic acid or its salt thereto include unsaturated hydrocarbon sulfonic acids such as vinylsulfonic acid, allylsulfonic acid, methacrylsulfonic acid and p-styrenesulfonic acid and salts thereof.

To introduce carboxylic acid or its salt, (meth)acrylic acid, maleic acid, or the like is used. To introduce phosphoric acid or its salt, (meth)acryl-2phosphate is used.

Preferably, the vinyl chloride copolymer has an epoxy group introduced therein. This is because introducing an epoxy group improves the thermal stability of the vinyl chloride copolymer.

When introducing an epoxy group, the content of the epoxy-containing repeat unit in the copolymer is preferably 1 to 30 mol. %, more preferably 1 to 20 mol. %.

Glycidyl acrylate is preferred as a monomer to introduce the epoxy group.

Methods of introducing a polar radical into vinyl chloride copolymer are described in Japanese Patent Publication Open to Public Inspection Nos. 44227/1982, 052/1983, 8127/1984, 101161/1985, 235814/1985, 306/1985, 238371/1985, 121923/1987, 146432/1987 and 433/1987 and other publications. These methods may be used for the present invention.

Synthesis of polyester and polyurethane resin for use as binders for the present invention is described below.

Generally, polyester is obtained by reaction of polyol and polybasic acid.

Using this known method, polyester having a polar radical (polyol) can be synthesized from a polybasic acid having a polar radical.

Examples of polybasic acids having a polar radical include 5-sulfoisophthalic acid, 2-sulfoisophthalic acid, -sulfoisophthalic acid, 3-sulfophthalic acid, dialkyl 5sulfoisophthalate, dialkyl 2-sulfoisophthalate, dialkyl 4-sulfoisophthalate, dialkyl 3-sulfoisophthalate, sodium salts and potassium salts thereof.

Examples of polyol include trimethylolpropane, hexanetriol, glycerol, trimethylolethane, neopentyl glycol, pentaerythritol, ethylene glycol, propylene glycol, 1,3-butanediol, 1,4-butanediol, 1,6-hexanediol, diethylene glycol and cyclohexanedimethanol.

It is also possible to synthesize a polyester incorporating another polar radical by a known method.

The synthesis of polyurethane is described below.

It is prepared by reaction of polyol and polyisocyanate.

The polyol used for this purpose is normally a polyester polyol obtained by reaction of polyol and polybasic acid.

It is therefore possible to synthesize a polyurethane having a polar radical by using a polyester polyol having a polar radical as a starting material.

Examples of polyisocyanate include diphenylmethane4,4'-diisocyanate (MDI), hexamethylenediisocyanate (HMDI), tolylenediisocyanate (TDI), 1,5-naphthalenediisocyanate (NDI), tolydinediisocyanate (TODI) and lysineisocyanate methyl ester (LDI).

As another method of polyurethane synthesis, polyurethane can be synthesized by addition reaction of an OH-containing polyurethane and one of the following compounds having both a polar radical and a chlorine atom.

$Cl-CH_2CH_2SO_3M$ $Cl-CH_2CH_2OSO_3M$ $Cl-CH_2COOM$ $Cl-CH_2-P(=O)(OM^1)_2$

Introduction of a polar radical into polyurethane is described in Japanese Patent Examined Publication No. 41565/1983 and Japanese Patent O.P.I. Nos. 92422/1982, 92423/1982, 8127/1984, 5423/1984, 5424/1984 and 121923/1987 and other publications. These methods may be used for the present invention.

In the present invention, the following resins can be used as binders in a ratio not exceeding 50% by weight of the total binder content.

Examples of the resin include vinyl chloride-vinyl acetate copolymer, vinyl chloride-vinylidene chloride copolymer, vinyl chloride-acrylonitrile copolymer, butadiene-acrylonitrile copolymer, polyamide resin, polyvinylbutyral, cellulose derivatives such as nitrocellulose, styrene-butadiene copolymer, phenol resin, epoxy resin, urea resin, melamine resin, phenoxy resin, silicone resin, acrylic resin, urea-formamide resin and various synthetic rubber resins, which resins have a weight-average molecular weight of 10000 to 200000.

(B-3) Other components

In the present invention, other components may be added in the uppermost magnetic layer to improve its quality, including an abrasive, a lubricant, a durability improving agent, a dispersing agent, an antistatic agent and electromagnetic finer powder.

The abrasive may be a known substance.

The average particle size of the abrasive is normally 0.05 to 0.6 μm, preferably 0.05 to 0.5 μm, and more preferably 0.05 to 0.3 μm.

The content of the abrasive in the uppermost layer is normally 3 to 20 parts by weight, preferably 5 to 15 parts by weight, and more preferably 5 to 10 parts by weight.

Fatty acid and/or fatty acid ester can be used as a lubricant. In this case, the addition amount of fatty acid is preferably 0.2 to 10% by weight, more preferably 0.5 to 5% by weight of magnetic powder. If the addition amount is lower than 0.2% by weight, the running property becomes liable to deterioration; if it exceeds 10% by weight, fatty acid oozes out on the surface of magnetic layer and output reduction becomes more likely to occur.

The amount of fatty acid ester added is preferably 0.2 to 10% by weight, more preferably 0.5 to 5% by weight of magnetic powder. If the amount of addition is lower than 0.2% by weight, the still durability becomes more liable to deterioration; if it exceeds 10% by weight, fatty acid oozes out on the surface of magnetic layer and output reduction becomes more likely to occur.

For enhancing the lubricating effect by using fatty acid and fatty acid ester in combination, the weight ratio of the fatty acid and fatty acid ester is preferably 10:90 to 90:10.

The fatty acid may be monobasic or dibasic, preferably having a carbon number of 6 to 30, more preferably 12 to 22.

Examples of fatty acids include caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid and octanedicarboxylic acid.

Examples of fatty acid esters include oleyl oleate, isosetyl stearate, dioleyl malate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, 2-ethylhexyl palmitate, isopropyl palmitate, isopropyl myristate, butyl laurate, setyl-2-ethyl hexalate, dioleyl adipate, diethyl adipate, diisobutyl adipate, diisodecyl adipate, oleyl stearate, 2-ethylhexyl myristate, isopentyl palmitate, isopentyl stearate, diethylene glycol-mono-butyl ether palmitate and diethylene glycol-mono-butyl ether palmitate.

In addition to the fatty acids and fatty acid esters described above, known substances can be used as lubricants, such as silicone oil, carbon fluoride, fatty acid amide and a-olefin oxide.

Examples of such hardeners include polyisocyanates, exemplified by aromatic polyisocyanates such as active hydrogen compound adducts of tolylenediisocyanate (TDI) and aliphatic polyisocyanates such as active hydrogen compound adducts of hexamethylene diisocyanate (HMDI). The weight-average molecular weight of polyisocyanate is desirably 100 to 3000.

Examples of such dispersants include fatty acids having a carbon number of 12 to 18 such as caprylic acid, capric acid, lauric acid, myristic acid, palmitic acid, stearic acid and oleic acid; alkali metal salts, alkaline earth metal salts or amides thereof; polyalkylene oxide alkylphosphates; lecithin; trialkylpolyolefin oxy-quaternary-ammonium salt; and azo compounds having a carboxyl group and a sulfonic acid group. These dispersants are used normally in 0.5 to 5% by weight of ferromagnetic powder.

Examples of such antistatic agents include cationic surfactants such as quaternary amine, anionic surfactants containing an acid group such as sulfonic acid, sulfuric acid, phosphoric acid, phosphate and carboxylic acid, amphoteric surfactants such as aminosulfonic acid, and natural surfactants such as saponin. The antistatic agent is added normally at 0.01 to 40% by weight of the binder.

In the present invention, electroconductive fine powder can be preferably used as an antistatic agent. Examples of such antistatic agents include antistatic agents prepared by coating metal particles such as those of carbon black, graphite, tin oxide, silver powder, silver oxide, silver nitrate, organic silver compounds and copper powder, and metal oxide pigments such as zinc oxide, barium sulfate and titanium oxide, with tin oxide or with an electroconductive material such as antimony-solid solution tin oxide films.

The average particle size of the electroconductive fine powder is normally 5 to 700 nm, preferably 5 to 200

The content of the electroconductive fine powder is normally 1 to 20 parts by weight, preferably 2 to 7 parts by weight to 100 parts by weight of the magnetic powder.

(C) Lower layer

The lower layer, comprising at least one layer, is formed as necessary in a single layer or multiple layers between the nonmagnetic support and the uppermost magnetic layer.

The lower layer may be configured with a single kind of layer or a combination of two or more layers, with no limitation. The lower layer is exemplified by a magnetic layer containing magnetic powder (C-1), a nonmagnetic layer containing nonmagnetic powder (C-2), a layer containing a material of high magnetic permeability (C-3) and a layer comprising a combination thereof. In the present invention, the lower layer is preferably a nonmagnetic layer (B-2), more preferably a nonmagnetic layer; containing needles of nonmagnetic powder.

The thickness of the lower layer is normally 0.1 to 2.5 μm, preferably 0.2 to 2.0 μm, and more preferably 0.5 to 2.0 μm. If the thickness exceeds 2.5 μm, so-called multiple layer surface roughness occurs, in which the upper layer surface roughness increases after multiple layer coating, which can result in undesirable electromagnetic converting property. If the thickness is smaller than 0.5 μm, high smoothness is difficult to obtain at calendering, which can deteriorate the electromagnetic converting property and spoil the effect of the lower layer.

(C-1) Magnetic layer

A magnetic layer in the lower layer contains magnetic powder. It also contains a binder and other components as necessary.

(C-1-1) Magnetic powder

The magnetic powder contained in a magnetic layer in the lower layer is not subject to limitation, any compound specified as an example for (B-1) can be preferably used. These magnetic powders may be used singly or in combination.

Of these magnetic powders, Co-containing iron oxide is preferred. When the magnetic layer in the lower layer contains Co-containing iron oxide, regeneration output is enhanced in the high recording wavelength band, particularly above 1 μm.

The magnetic powder content is normally 70 to 90% by weight, preferably 75 to 85% by weight of the total solid content in the layer.

(C-1-2) Binder

The binder contained in the magnetic layer in the lower layer may be a compound specified for (B-2), its content being normally 5 to 25 parts by weight, preferably 10 to 20 parts by weight per 100 parts by weight of ferromagnetic metal powder.

(C-1-3) Other components

The other components contained in the magnetic layer in the lower layer may be compounds specified for (B-3). Their content can be optionally chosen as appropriate without limitation, as long as the accomplishment of the object of the present invention is not interfered with.

(C-2) Nonmagnetic layer

The nonmagnetic layer contains nonmagnetic powder. It also contains a binder and other components as necessary.

(C-2-1) Nonmagnetic powder

In the present invention, various known nonmagnetic powders can be used optionally as appropriate.

Examples of nonmagnetic powders include carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr2O_3$, $a-Al_2O_3$, $a-Fe_2O_3$, a-FeOOH, SiC, cerium oxide, corundum, artificial diamond, a-iron oxide, garnet, silicate, silicon nitride, boron nitride, silicon carbide, molybdenum carbide, boron carbide, tungsten carbide, titanium carbide, tripoli, diatomaceous earth and dolomite.

Of these nonmagnetic powders, preference is given to inorganic powders such as carbon black, $CaCO_3$, $TiO_2$, barium sulfate, $a-Al_2O_3$, $a-Fe_2O_3$, a-FeOOH and $Cr_2O_3$.

In the present invention, needles of nonmagnetic powder can be preferably used. Using such needles of nonmagnetic powder offers improved surface smoothness of the nonmagnetic layer and improved surface smoothness of the uppermost magnetic layer formed thereon.

The major axis length of the nonmagnetic powder is normally not greater than 0.50 μm, preferably not greater than 0.40 μm, and more preferably not greater than 0.30 μm.

The minor axis length of the nonmagnetic powder is normally not greater than 0.10 μm, preferably not greater than 0.08 μm, and more preferably not greater than 0.06 μm.

The axial ratio of the nonmagnetic powder is normally 2 to 20, preferably 5 to 15, and more preferably 5 to 10. The axial ratio mentioned herein is defined as the ratio of the major axis length to the minor axis length (major axis length/minor axis length).

The specific surface area of the nonmagnetic powder is normally 10 to 250 $m^2/g$, preferably 20 to 150 $m^2/g$, and more preferably 30 to 100 $m^2/g$.

It is preferable to use a nonmagnetic powder whose major axis length, minor axis length, axial ratio and specific surface area fall within the above ranges, because the surface condition of the uppermost magnetic layer, as well as the surface quality of the nonmagnetic layer, can be improved.

In the present invention, the nonmagnetic powder has preferably been surface treated with an Si compound and/or an Al compound. Using a nonmagnetic powder after such surface treatment offers a good surface condition of the uppermost magnetic layer. The Si and/or Al content is preferably 0.1 to 10% by weight of Si and 0.1 to 10% by weight of Al relative to the nonmagnetic powder.

The content of the nonmagnetic powder in the nonmagnetic layer is normally 50 to 99% by weight, preferably 60 to 95% by weight, and more preferably 70 to 95% by weight of the total content of all components of the nonmagnetic layer. Provided that nonmagnetic powder content falls within the above range, the surface conditions of the uppermost magnetic layer and nonmagnetic layer can be improved.

(C-2-2) Binder

The binder contained in the nonmagnetic layer in the lower layer may be a compound specified for (B-2), its content being normally 5 to 150 parts by weight, preferably 10 to 120 parts by weight of 100 parts by weight of nonmagnetic powder.

(C-2-3) Other components

The other components contained in the nonmagnetic layer in the lower layer may be compounds specified for (B-3). Their content can be optionally chosen as appropriate without limitation, as long as the accomplishment of the object of the present invention is not interfered with.

(C-3) Layer containing a material of high magnetic permeability

The layer containing a material of high magnetic permeability may also contain a binder and other components as necessary.

(C-3-1) Material of high magnetic permeability

The material of high magnetic permeability has a coercive force Hc of $0<Hc\leq1.0\times10^4$ (A/m), preferably $0<Hc\leq5.0\times10^3$ (A/m). Provided that the coercive force falls within this range, the material of high magnetic permeability serves well to stabilize the magnetized region in the uppermost layer. Coercive forces exceeding the above range are undesirable because magnetic material nature can hampers the obtainment of the desired properties.

In the present invention, it is preferable to choose as appropriate a material of high magnetic permeability whose coercive force falls within the above range. Such materials of high magnetic permeability include soft magnetic metal materials and soft magnetic oxide materials.

Such soft magnetic metal materials include Fe-Si alloy, Fe-Al alloy (Alperm, Alfenol, Alfer), Permalloys (Ne-Fe-based binary alloy, multiple alloys resulting from addition of Mo, Cu, Cr, etc. to Ni-Fe-based binary alloy), Sendast (Fe-Si-Al in a ratio of 9.6% by weight of Si, 5.4% by weight of Al and the remaining % by weight of Fe), and Fe-Co alloy. Of these soft magnetic metal materials, Sendast is preferred. The soft magnetic metal material as a material of high magnetic permeability is exemplified by, but not limited to, the above examples. Material of high magnetic permeability may be used singly or in combination.

Examples of the soft magnetic oxide materials include spinel type ferrites such as $MnFe_2O_4$, $Fe_3O_4$, $CoFe_2O_4$, $NiFe_2O_4$, $MgFe_2O_4$ and $Li_{0.5}Fe_{2.5}O_4$, Mn-Za ferrite, Ni-Zn ferrite, Ni-Cu ferrite, Cu-Zn ferrite, Mg-Zn ferrite and Li-Zn ferrite, with preference given to Mn-Zn ferrite and Ni-Zn ferrite. These soft magnetic oxide materials may be used singly or in combination.

The material of high magnetic permeability is preferably milled to fine powder having a particle size of 1 mμ to 1000 mμ, preferably 1 mm to 500 mm, using a ball mill or another mill. Such fine powder can be obtained by spraying a fused alloy in a vacuum in the case of soft magnetic metal materials. In the case of soft magnetic oxide materials, they can be milled to fine powder by methods such as the glass crystallization method, the coprecipitation burning method, the hydrothermal synthetic method, the flux method, the alkoxide method and the plasma jet method.

The material of high magnetic permeability content in the layer containing it is normally 10 to 100% by weight, preferably 50 to 100% by weight, and more preferably 60 to 100% by weight. Provided that the material of high magnetic permeability content falls within this range, uppermost layer magnetization is sufficiently stabilized. Contents of high magnetic permeability material of lower than 50% by weight are undesirable because no effect on the high magnetic permeability layer is obtained in some cases.

The layer containing a material of high magnetic permeability may contain nonmagnetic particles.

(C-3-2) Binder

The binder contained in the lower layer containing a material of high magnetic permeability may be a compound specified for (B-2), its content being normally 5 to 30 parts by weight, preferably 10 to 25 parts by weight per 100 parts by weight of the material of high magnetic permeability.

(C-3-3) Other components

The other components contained in the lower layer containing a material of high magnetic permeability may be compounds specified for (B-3). Their content can be optionally chosen as appropriate without limitation, as long as the accomplishment of the object of the present invention is not interfered with.

Production of magnetic recording medium

The magnetic recording medium of the present invention is preferably produced by the wet-on-wet method, in which the magnetic layer is coated while the lower layer is in a wet state. For this wet-on-wet method, procedures for production of known multiple layer structure magnetic recording medium can be used as appropriate.

For example, it is common practice to knead a magnetic powder, a binder, a dispersing agent, a lubricant, an abrasive, an antistatic agent and other additives and a solvent to yield a dense magnetic coating composition, which is then diluted to yield a magnetic coating composition, which is coated on the surface of the nonmagnetic support.

Examples of the solvent include ketones such as acetone, methyl ethyl ketone (MEK), methyl isobutyl ketone (MIBK) and cyclohexanone, alcohols such as methanol, ethanol and propanol, esters such as methyl acetate, ethyl acetate, butyl acetate, propyl acetate, ethyl lactate and ethylene glycol monoacetate, ethers such as diethylene glycol dimethyl ether, 2-ethoxyethanol, tetrahydrofuran and dioxane, aromatic hydrocarbons such as benzene, toluene and xylene and halogenated hydrocarbons such as methylene chloride, ethylene chloride, carbon tetrachloride, chloroform, ethylene chlorohydrin and dichlorobenzene.

In the kneading and dispersion of the magnetic layer forming components, various kneaders can be used.

Examples of the kneader include the double-roll mill, triple-roll mill, ball mill, pebble mill, cobble mill, Tron mill, sand mill, sand grinder, Sqegvari attriter, high speed impeller disperser, high speed stone mill, high speed impact mill, disper kneader, high speed mixer, homogenizer, ultrasonic disperser, open kneader, continuous kneader and pressure kneader. Of these kneaders, the pressure kneader, open kneader, continuous kneader, double-roll mill and triple-roll mill are capable of offering a power consumption load of 0.05 to 0.5 KW (per kg magnetic powder).

The uppermost magnetic layer and lower layer can be coated on a nonmagnetic powder by double coating the uppermost layer magnetic coating composition and lower layer coating composition on nonmagnetic support by the wet-on-wet method, passing it by orientation magnet or vertical orientation magnet, introducing it into drier, and drying it with hot blow from the upper and lower nozzles. Then, the support with dried coating layers is introduced into super-calenderer. The thus-obtained magnetic film may be cut into tapes of desired width to yield a magnetic recording tape for 8 mm video movie.

Each coating composition may be supplied to extrusion coaters via an in-line mixer. Extrusion coaters, each equipped with coating composition reservoir, coat the coating compositions from respective reservoirs by the wet-on-wet method, in which the uppermost layer magnetic coating composition is coated on the lower layer coating composition just after coating the lower layer coating composition (while remaining wet).

Extrusion coater co-extrudes lower layer coating composition 2 and uppermost layer magnetic coating composition 4 for double layer coating.

Examples of the solvent contained in the above coating compositions or the diluent in coating the coating compositions include ketones such as acetone, methyl ethyl ketone, methyl isobutyl ketone and cyclohexanone, alcohols such as methanol, ethanol, propanol and butanol, esters such as methyl acetate, ethyl acetate, butyl acetate, ethyl lactate and ethylene glycol monoacetate, ethers such as glycol dimethyl ether, glycol monoethyl ether, dioxane and tetrahydrofuran, aromatic hydrocarbons such as benzene, toluene and xylene, and halogenated hydrocarbons such as methylene chloride, ethylene chloride, carbon tetrachloride, chloroform and dichlorobenzene. These solvents may be used singly or in combination.

The magnetic field of the orientation magnet or vertical orientation magnet is about 20 to 10000 Gauss. The drier is operated at about 30° to 120° C. for about 0.1 to 10 minutes.

In the wet-on-wet method, a combination of a reverse roll and an extrusion roll, a combination of a gravure roll and an extrusion roll and other combinations can also be used. Also, an air doctor coater, a blade coater, an air knife coater, a squeeze coater, an impregnation coater, a transfer roll coater, a kiss coater, a cast coater, a spray coater, etc. can also be used in combination.

In multiple layer coating by the wet-on-wet method, the lower layer surface (interface with the uppermost layer) is smooth, the uppermost layer surface quality is good and adhesion between the upper and lower layers improves because the uppermost magnetic layer is coated while the lower layer remains wet. This meets the requirements of high output and low noise for high density recording, e.g., the performance requirements for a magnetic tape, and durability is sufficient as a result of elimination of layer peeling and improved layer strength. Also, the wet-on-wet coating method offers reduced dropouts and improved reliability.

Surface smoothing

In the present invention, surface smoothing by calendering is preferable.

This surface smoothing may be followed by varnish treatment or blade treatment as necessary, and subsequent slitting.

Calendering factors adjusted for surface smoothing include temperature, linear pressure and C/s (coating speed).

In the present invention, it is preferable to keep a temperature of 50° to 140° C., a linear pressure of 50 to 400 kg/cm and a C/s value of 20 to 1000 m/min in normal cases. Failure to meet these numerical requirements can result in difficulty or even impossibility in keeping a good surface condition of the magnetic recording medium.

The thickness of the thus-treated uppermost layer is normally not greater than 0.6 μm, preferably 0.02 to 0.6 μm. If the layer thickness exceeds 0.6 mm, electric property deterioration hampers the obtainment of a magnetic recording medium suitable for the object of the invention, i.e., use for digital recording media.

EXAMPLES

The components, ratios, orders of operation and other features shown below are variable, as long as the scope of the invention is not deviated from. "Part(s)" means part(s) by weight without exception.

The starting components for an uppermost layer magnetic magnetic coating composition and lower layer magnetic coating composition, having the following compositions, were kneaded and dispersed using a kneader and a sand mill, respectively, to yield an uppermost layer magnetic coating composition and a lower layer magnetic coating composition.

Uppermost layer magnetic coating composition

| Ferromagnetic metal powder (average major axis length 0.15 mm, Hc 1700 Oe, BET 53 m²/g) | 100 parts |
| --- | --- |
| Vinyl chloride resin containing potassium sulfonate (MR110, produced by Nippon Zeon Co., Ltd.) | 10 parts |
| Polyurethane containing sodium sulfonate (UR-8700, produced by Toyobo Co., Ltd.) | 10 parts |
| a-alumina having an average grain size of 0.15 μm | 8 parts |
| Stearic acid | 1 part |
| Butyl stearate | 1 part |
| Cyclohexanone | 100 parts |
| Methyl ethyl ketone | 100 parts |
| Toluene | 100 parts |

Lower layer coating composition A a-Fe$_2$O$_3$ (major axis length 0.10 μm, minor axis length 0.02 μm, axial ratio 9, BET 55 m²/g, surface treated with Si and Al compounds, 0.1% by weight of Si and 0.3% by weight of Al) 100 parts

| Vinyl chloride resin containing potassium sulfonate (MR110, produced by Nippon Zeon Co., Ltd.) | 12 parts |
| --- | --- |
| Polyurethane containing sodium sulfonate (UR-8700, produced by Toyobo Co., Ltd.) | 8 parts |
| a-alumina having an average grain size of 0.2 μm | 5 parts |
| Carbon-black (15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

To each of the thus-obtained uppermost layer magnetic coating composition and lower layer coating composition A was added 5 parts of a polyisocyanate compound (Coronate L, produced by Nippon Polyurethane Industry Co., Ltd.).

Lower layer coating composition B

Lower layer coating composition B was prepared in the same manner as for lower layer coating composition A except that a-Fe$_2$O$_3$ was replaced with Co-a-Fe$_2$O$_3$ (Hc=650 Oe).

Examples 1 through 16 and Comparative Examples 1 through 7

An uppermost layer magnetic coating composition containing a ferromagnetic metal powder and a lower layer coating composition containing a nonmagnetic powder, shown in Table 1, were coated on a polyethylene terephthalate film of 10 μm thickness by the wet-on-wet method, after which the film was subjected to a magnetic orientation treatment while the layers remaining wet, followed by drying and subsequent surface smoothing by calendering, to yield a magnetic layer comprising a lower layer and an uppermost layer shown in Table 2.

A coating composition of the following composition was coated on the opposite face (back face) of the polyethylene terephthalate film, followed by drying and calendering under the above-described conditions, to form a back coating layer of 0.8 μm thickness to yield a wide bulk magnetic tape.

| Carbon black (Raven 1035) | 40 parts |
| --- | --- |
| Barium sulfate (average particle size 300 nm) | 10 parts |
| Nitrocellulose | 25 parts |
| Polyurethane resin (N-2301, produced by Nippon Polyurethane Co., Ltd.) | 25 parts |
| Polyisocyanate compound (Coronate L, produced by Nippon Polyurethane Co., Ltd.) | 10 parts |
| Cyclohexanone | 400 parts |
| Methyl ethyl ketone | 250 parts |
| Toluene | 250 parts |

The thus-obtained original magnetic tape was slit to yield an 8-mm wide magnetic recording medium for video recording. This magnetic recording medium was evaluated as follows: The results are given in Table 2.

Evaluation

Overall composition

The content ratios of Fe, Co, Ni, Nd, Si, Al, Y, Pr, La and Sm in the overall composition of the ferromagnetic metal powder were calculated by the fundamental parameter method (hereinafter referred to as the FP method) after the X-ray fluorescence intensity of each element was determined using a wavelength dispersion type X-ray fluorometer (WDX).

The FP method is described below.

X-ray fluorometry was conducted using the WDX system 3080, produced by Rigaku Denki K.K., under the conditions shown below.

X-ray bulb: Rhodium bulb
Output: 50 KV, 50 mA
Spectral crystals: LiF (for Fe, Co, Ni, Nd, Pr, Sm, La and Y), PET (for Al) , RX-4 (for Si)
Absorber: 1/1 (1/10 for Fe alone)
Slit: COARSE
Filter: OUT
PHA: 15 to 30 (for Al and Si), 10 to 30 (for Fe, Co, Ni, Nd, Pr, Sm, La and Y)
Counting time: peak =40 seconds, background =40 seconds (measured at two points around the peak)

This instrument is not limitative; various X-ray fluorometers can be used.

Eight metal compounds were used as standard samples as follows:

Standard sample 1 was SRM 1219, an alloy produced by Analytical Reference Materials International Company (0.15% C, 0.42% Mn, 0.03% P, 0.55% Si, 0.16% Cu, 2.16% Ni, 15.64% Cr, 0.16% Mo, 0.06% V, by weight).

Standard sample 2 was SRM 1250, an alloy produced by Analytical Reference Materials International Company (37.78% Ni, 0.08% Cr, 0.01% Mo, 16.10% Co, 0.99% Al, by weight).

Standard sample 3 was a magnetic iron oxide powder (0.14% Mn, 0.15% P, 0.19% S, 0.36% Si, 3.19% Co, 1.26% Zn, 0.07% Ca, 0.02% Na, by weight).

Standard sample 4 was a ferromagnetic metal powder (2.73% Nd by weight).

Standard sample 5 was a ferromagnetic metal powder (0.97% Sr by weight).

Standard sample 6 was a ferromagnetic metal powder (1.40% Ba and 0.40% Ca by weight).

Standard sample 7 was a ferromagnetic metal powder (2.69 % La by weight ).

Standard sample 8 was a ferromagnetic metal powder (1.98% Y by weight).

The weight percent values for the elements in standard samples 1 and 2 are from data sheets supplied by the manufacturer, those in standard samples 3 and 4 to 8 are analytical values obtained with an ICP light emission analyzer. These figures were input as the elemental analytical composition of the standard sample for the calculation by the FP method as follows:

Calculations by the FP method were made using the fundamental parameter software Version 2.1, produced by Technos, under the following conditions:

Model sample: Bulk sample
Balanced component sample: Fe
Input component: Found X-ray intensity (KCPS)
Analytical unit: % by weight The content ratio of each element (% by weight) was obtained relative to the weight of Fe atoms.

Surface composition

The content ratios of Fe, Co, Ni, Nd, Pr, Sm, La, Y, Si and Al in the surface composition of the ferromagnetic metal powder were obtained using an XPS surface analyzer.

The analytical procedure employed is described below.

The XPS surface analyzer was set to the following conditions:

X-ray anode: Mg
Resolution: 1.5 to 1.7 eV (defined as the half-value width of the 3d5/2 peak of clear Ag)

No adhesive tapes were used to fix the sample. Although various types of XPS surface analyzer can be used, the ESCALAB-200R of VG Company was used herein.

Narrow scans were conducted over the measuring range shown below to obtain the spectra of respective elements. Data intake interval was set at 0.2 eV, and data were integrated until the minimum count shown in Table 3 was obtained.

For the spectrum thus obtained, energy position was corrected to have a C peak at 284.6 eV.

Next, to process data on the COMMON DATA PROCESSING SYSTEM Ver. 2.3 produced by VAMAS-SCA-Japan (hereinafter referred to as the VAMAS software), each of the above spectra was transferred to a computer on which the VAMAS software is available, using a software supplied by the instrument manufacturer.

After the transferred spectrum was converted into data in the VAMAS format, using the VAMAS software, the data were processed as follows:

Before quantitative processing, the count scale was calibrated for each element for 5-point smoothing.

The quantitative processing was conducted as follows.

With the peak position of each element as the center, peak area intensity was determined over the quantitation range given in Table 3. Next, percent atomic number of each element was calculated, using the coefficient of sensitivity given in Table 3, relative to the number of Fe atoms.

The average content ratios of the elements constituting the surface of the ferromagnetic metal powder in the oriented dried magnetic coating layers are determined using an XPS surface analyzer.

The analytical procedure is described below. The XPS surface analyzer was set to the following conditions:

X-ray anode: Mg
Resolution: 1.5 to 1.7 eV (defined as the half-value width of the 3d5/2 peak of clear Ag)

Although any type of XPS surface analyzer can be used without limitation, the ESCALAB-200R of VG Company was used herein.

Narrow scans were conducted over the measuring range shown below to obtain the spectra of respective elements. Data intake interval was set at 0.2 eV, and data were integrated until the minimum count shown in Table 3 was obtained.

| Peak | Measuring range (binding energy in eV) | Minimum detection intensity (count) |
| --- | --- | --- |
| Cls | 305 to 280 | Arbitrary |
| Fe2p3/2 | 730 to 700 | 600000 |
| Na(KL23L23) Auger peak | 280 to 250 | 600000 |

For the spectrum thus obtained, energy position was corrected to have a C peak at 284.6 eV.

Next, to process data on the COMMON DATA PROCESSING SYSTEM Ver. 2.3 produced by VAMAS-SCA-Japan (hereinafter referred to as the VAMAS software), each of the above spectra was transferred to a computer on which the VAMAS software is available, using a software supplied by the instrument manufacturer. After the transferred spectrum was converted into data in the VAMAS format, using the VAMAS software, the data were processed as follows:

Before quantitative processing, the count scale was calibrated for each element for 5-point smoothing. With the peak position of each element as the center, peak area intensity (cps*eV) was determined over the quantitation range given in Table 3. Next, percent atomic number of each element was calculated, using the coefficients of sensitivity given below, relative to the number of Fe atoms.

| Element | Peak position (B.E.:eV) | Measuring range (B.E.:eV) | Sensitivity Coefficient |
|---|---|---|---|
| Fe | Near 719.8 | 5 eV on the high B.E. side, 7 eV in the low B.E. side | 10.54 |
| Na | Near 264.0 | Minimum value near 2 eV on the high B.E. side, 6 eV on the low B.E. side | 7.99 |

For the elements other than the above elements, the following conditions were used:

| Element | Measuring range (B.E.) | Minimum Counts (thousand) | Quantitation range (Value from peak) High B.E. | Quantitation range (Value from peak) Low B.E. | Sensitivity Coefficient |
|---|---|---|---|---|---|
| Nd | 244 to 224 | 50 | 6 eV | 6 eV | 2.71 |
| Y | 172 to 152 | 100 | 6 eV | 5 eV | 6.240 |
| La | 854 to 830 | 1000 | 9 eV | 6 eV | 26.490 |
| si | 165 to 145 | 60 | 5 eV | 6 eV | 0.885 |
| Al | 88 to 68 | 50 | 4 eV | 4 eV | 0.57 |
| Ca | 366 to 342 | 100 | 10 eV | 5 eV | 5.130 |
| Ba | 808 to 790 | 1000 | 5 eV | 5 eV | 17.040 |
| Sr | 150 to 130 | 300 | 5 eV | 4 eV | 5.290 |

Sample preparation

Before measurements, the recording medium (magnetic tape) was pre-treated.

The binder resin was removed from the magnetic tape by the plasma cold incineration method to expose magnetic particles, under such conditions that the binder resin was incinerated while the magnetic particles remain intact. For example, the pre-treatment was conducted using the following instrument and conditions, after which the average content ratios of the elements constituting the surface of the oriented ferromagnetic metal powder were determined.

Instrument: PL-850X, produced by Meiwa Shoji
FORWARD POWER: 100 W
REFLECTED POWER: 5 W
Degree of vacuum: 10 Pa
Injected gas: Air
Discharge time: 1 minute Electric properties (dB), RF output, CN ratio Using the 8-mm video camera CCDV-900, produced by Sony Corporation, RF output (dB) was determined at 7 MHz and 9 MHz. The difference (dB) between output at 7 MHz and that at 6 MHz was calculated for CN ratio.

Running durability

Rerunning durability was tested in 100 cycles of running at 40∞C temperature and 80% humidity and also at 0∞C temperature and 20% humidity, and evaluated on the following criteria:
A: No problems
B: Back face flaws
C: Running seen but D/O often exceeded 50.
D: Running seen but electric property reduction of 2 dB or more
E: Running discontinued Tape magnetism loss (%)

After the tape sample was exposed to 60∞C. temperature and 90% humidity for 1 week, the tape magnetism loss was calculated, using the following equation, based on the value for the tape's saturation magnetic density B. ($B_1$ before exposure - $B_2$ after exposure)/($B_1$ before exposure) x 100 (%)

Surface roughness after multiple layer coating

The surface after multiple layer coating was observed for surface roughness under a light microscope, the degree of surface roughness being evaluated as follows:
A: Surface roughness equivalent to that obtained after coating the uppermost layer coating composition alone
B: More smooth than the surface obtained after coating the uppermost layer coating composition alone
C: More rough than the surface obtained after coating the uppermost layer coating composition alone

TABLE 1

| Sample | Whole composition Fe | Rare Earth | | Al | Na | Ca | Co | Ni | Si | Surface Composition Fe | Rare Earth | | Al | Na | Ca | Co | Ni | Si | Hc (Oe) | Major axis length (μm) | Specific surface area (m²/g) |
|---|---|---|---|---|---|---|---|---|---|---|---|---|---|---|---|---|---|---|---|---|---|
| 1 | 100 | Nd | 4 | 6 | 0.001 | 0.3 | 0 | 0 | 0 | 100 | Nd | 15 | 180 | 20 | 10 | 0 | 0 | 0 | 1700 | 0.15 | 53 |
| 2 | 100 | Sm | 5 | 4 | 0.08 | 0.1 | 2 | 1 | 0.5 | 100 | Sm | 25 | 120 | 30 | 12 | 0 | 3 | 20 | 1750 | 0.16 | 50 |
| 3 | 100 | Y | 3 | 2 | 0.005 | 2.0 | 1 | 20 | 4 | 100 | Y | 10 | 80 | 23 | 30 | 0 | 0.01 | 130 | 1650 | 0.17 | 5.1 |
| 4 | 100 | Pr | 1 | 10 | 0.01 | 1.0 | 20 | 7 | 2 | 100 | Pr | 3 | 180 | 27 | 25 | 0.01 | 0 | 80 | 1700 | 0.15 | 55 |
| 5 | 100 | Nd | 3 | 4 | 0.001 | 0.5 | 6 | 3 | 2 | 100 | Nd | 10 | 100 | 10 | 10 | 0 | 0 | 50 | 1900 | 0.11 | 56 |
| 6 | 100 | ND | 4 | 4 | 0.0003 | 0.5 | 13 | 4 | 2 | 100 | ND | 15 | 95 | 15 | 13 | 0 | 0 | 70 | 2000 | 0.09 | 58 |
| 7 | 100 | Nd | 3 | 6 | 0.0005 | 0.7 | 8 | 2 | 1 | 100 | Nd | 30 | 110 | 16 | 18 | 0 | 0 | 40 | 2100 | 0.06 | 62 |
| 8 | 100 | ND | 4 | 4 | 0.0006 | 0.6 | 6 | 3 | 2 | 100 | ND | 10 | 100 | 3 | 6 | 20 | 0 | 25 | 1800 | 0.16 | 52 |
| 9 | 100 | Nd | 3 | 4 | 0.0001 | 0.5 | 6 | 3 | 2 | 100 | Nd | 35 | 100 | 10 | 10 | 0 | 0 | 50 | 1700 | 0.16 | 54 |
| 10 | 100 | ND | 4 | 4 | 0.0003 | 0.5 | 13 | 4 | 2 | 100 | ND | 0.3 | 95 | 15 | 13 | 2 | 0 | 70 | 1600 | 0.13 | 56 |
| 11 | 100 | Nd | 0.3 | 5 | 0.002 | 0.5 | 4 | 4 | 1 | 100 | Nd | 1 | 85 | 15 | 20 | 0.1 | 0 | 20 | 1650 | 0.17 | 50 |
| 12 | 100 | Nd | 10 | 3 | 0.04 | 0.8 | 6 | 4 | 2 | 100 | Nd | 45 | 10 | 40 | 30 | 0 | 0 | 50 | 1700 | 0.16 | 52 |
| 13 | 100 | — | 0 | 6 | 0.001 | 0.6 | 6 | 3 | 1 | 100 | — | 0 | 5 | 5 | 6 | 0 | 0 | 40 | 1550 | 0.18 | 52 |
| 14 | 100 | Nd | 5 | 0 | 0.005 | 0.3 | 5 | 4 | 2 | 100 | Nd | 10 | 8 | 8 | 10 | 0 | 0 | 35 | 1500 | 0.19 | 56 |
| 15 | 100 | — | 0 | 6 | 0.0003 | 0.8 | 0 | 0 | 0 | 100 | — | 0 | 10 | 10 | 0 | 0 | 0 | 0 | 1600 | 0.18 | 53 |

TABLE 2

| | Ferromagnetic Metal | Thickness Upper layer | Thickness Lower layer | Lower layer Composition | Output Level 7 MHz | Output Level 9 MHz | C/N (dB) | Running durability 40° C. 80% | Running durability 0° C. 20% | Magnetism loss (%) | Surface roughness of double layer coating |
|---|---|---|---|---|---|---|---|---|---|---|---|
| Invention | | | | | | | | | | | |
| 1 | 1 | 0.15 | 2.0 | A | 1.5 | 1.5 | 1.0 | A | A | 7 | A |
| 2 | 2 | 0.15 | 2.0 | A | 1.0 | 1.5 | 1.0 | B | A | 6 | A |
| 3 | 3 | 0.15 | 2.0 | A | 1.5 | 1.0 | 1.5 | A | B | 7 | A |
| 4 | 4 | 0.15 | 2.0 | A | 1.0 | 1.5 | 1.5 | A | A | 2 | A |
| 5 | 5 | 2.0 | 0.0 | — | 2.0 | 2.0 | 2.0 | A | A | 4 | A |
| 6 | 5 | 0.15 | 2.0 | A | 3.0 | 3.5 | 2.5 | A | A | 5 | B |
| 7 | 5 | 0.25 | 1.8 | B | 2.5 | 3.0 | 2.0 | A | A | 5 | B |
| 8 | 6 | 2.0 | 0.0 | — | 2.5 | 2.5 | 3.0 | A | A | 4 | A |
| 9 | 6 | 0.15 | 2.0 | A | 3.5 | 4.0 | 4.0 | A | A | 6 | B |
| 10 | 6 | 0.25 | 1.8 | B | 3.0 | 3.0 | 3.5 | A | A | 5 | B |
| 11 | 7 | 0.15 | 2.0 | A | 4.5 | 5.5 | 5.0 | A | A | 4 | A |
| 12 | 8 | 0.15 | 2.0 | A | 1.5 | 2.0 | 1.0 | B | B | 3 | A |
| 13 | 9 | 0.15 | 2.0 | A | 2.0 | 1.0 | 1.0 | B | B | 5 | A |
| 14 | 10 | 0.15 | 2.0 | A | 1.0 | 1.0 | 0.5 | B | A | 6 | A |
| 15 | 11 | 0.15 | 2.0 | A | 1.0 | 1.5 | 1.5 | A | B | 8 | A |
| 16 | 12 | 0.15 | 2.0 | A | 1.5 | 1.5 | 1.5 | A | B | 6 | A |
| Comparative | | | | | | | | | | | |
| 1 | 13 | 2.0 | 0.0 | — | −1.0 | −1.0 | −1.0 | B | B | 9 | A |
| 2 | 13 | 0.15 | 2.0 | A | −0.5 | −0.0 | −1.5 | D | A | 7 | C |
| 3 | 13 | 0.25 | 1.8 | B | −1.5 | −1.5 | −1.0 | C | B | 8 | C |
| 4 | 14 | 0.15 | 2.0 | A | −1.0 | −1.0 | 0.5 | B | C | 18 | C |
| 5 | 15 | 2.0 | 0.0 | — | 0.0 | 0.0 | 0.0 | A | B | 5 | A |
| 6 | 15 | 0.15 | 2.0 | A | 0.5 | −0.5 | −1.0 | D | C | 4 | A |
| 7 | 15 | 0.25 | 1.8 | B | −0.5 | 0.0 | 0.5 | D | B | 7 | C |

TABLE 3

| Element | Measuring Range (B.E.) | Minimum Counts (thousand) | Quantitation range (Value from peak) | Sensitivity Coefficient |
|---|---|---|---|---|
| Fe | 725 to 700 | 1,000 | +7 eV to −6 eV | 10.54 |
| Co | 800 to 770 | 1,000 | +12 eV to −8 eV | 12.2 |
| Ni | 875 to 845 | 300 | +15 eV to −6 eV | 13.92 |
| Nd | 244 to 220 | 50 | +6 eV to −6 eV | 2.71 |
| Y | 172 to 152 | 100 | +6 eV to −5 eV | 6.240 |
| La | 854 to 830 | 1000 | +9 eV to −6 eV | 26.490 |
| Si | 165 to 145 | 60 | +5 eV to −6 eV | 0.855 |
| Al | 88 to 68 | 50 | +4 eV to −4 eV | 0.57 |
| Ca | 366 to 342 | 100 | +10 eV to −5 eV | 5.130 |
| Ba | 808 to 790 | 1000 | +5 eV to −5 eV | 17.040 |
| Sr | 150 to 130 | 300 | +5 eV to −4 eV | 5.290 |
| Na | 1088 to 1068 | 1500 | +4 eV to −5 eV | 7.990 |

TABLE 4

| | Upper layer Surface composition of Ferromagnetic powder Al | Upper layer Surface composition of Ferromagnetic powder Rare Earth metal | | Upper layer Thickness | Lower layer Composition (*) | Lower layer Thickness | Output (dB) 7 MHz | Output (dB) 9 MHz | C/N (dB) | Running durability 40° C., 80% | Running durability 0° C., 20% |
|---|---|---|---|---|---|---|---|---|---|---|---|
| Example 1 | 80 | Y | 50 | 0.20 | non-magnetic A | 1.2 | 2.0 | 2.5 | 2.0 | A | A |
| Example 2 | 300 | Sm | 0.5 | 0.20 | non-magnetic A | 0.2 | 1.0 | 1.5 | 1.5 | A | A |
| Example 3 | 200 | Pr | 60 | 0.55 | non-magnetic A | 2.0 | 2.5 | 2.0 | 2.5 | A | A |
| Example 4 | 110 | Nd | 20 | 0.25 | non-magnetic A | 1.8 | 3.5 | 3.0 | 4.0 | A | A |
| Example 5 | 120 | Nd | 25 | 0.18 | non-magnetic A | 1.7 | 3.5 | 4.0 | 4.5 | A | A |
| Example 6 | 90 | Nd | 15 | 0.20 | non-magnetic A | 1.6 | 3.0 | 3.5 | 3.5 | A | A |
| Example 7 | 150 | Y | 30 | 0.60 | non-magnetic C | 1.6 | 1.0 | 1.5 | 1.0 | A | A |
| Example 8 | 130 | Y | 45 | 0.02 | non-magnetic D | 1.4 | 3.5 | 3.5 | 3.0 | A | A |
| Example 9 | 60 | Nd | 20 | 0.50 | magnetic B | 1.3 | 1.0 | 1.0 | 1.5 | A | A |
| Example 10 | 130 | Nd | 3 | 2.0 | — | — | 1.0 | 1.5 | 1.5 | B | A |
| Example 11 | 160 | Nd | 20 | 0.30 | non-magnetic E | 1.2 | 2.0 | 2.0 | 2.5 | A | B |

TABLE 4-continued

| | Upper layer | | | | | | | | | Running durability | |
|---|---|---|---|---|---|---|---|---|---|---|---|
| | Surface composition of Ferromagnetic powder | | | | Lower layer | | Output (dB) | | C/N | 40° C., | 0° C., |
| | | Rare Earth | | | | | | | | | |
| | Al | metal | | Thickness | Composition (*) | Thickness | 7 MHz | 9 MHz | (dB) | 80% | 20% |
| Comp. Example 1 | 20 | Sm | 2 | 0.40 | non-magnetic A | 1.5 | 0.0 | −0.5 | 0.0 | C | A |
| Comp. Example 2 | 350 | Nd | 15 | 0.30 | non-magnetic A | 2.0 | −1.0 | −2.0 | −1.5 | B | B |
| Comp. Example 3 | 400 | — | | 0.30 | non-magnetic C | 1.2 | −0.5 | −1.0 | −0.5 | C | D |
| Comp. Example 4 | 150 | Nd | 70 | 0.40 | non-magnetic D | 2.0 | −1.0 | −1.5 | −1.5 | D | B |
| Comp. Example 5 | 120 | Nd | 65 | 0.50 | magnetic B | 1.3 | −2.0 | −2.5 | −3.0 | E | D |

(*) in Table 4
A: Needle-shaped iron oxide
B: Co-adsorbed iron oxide
C: Spherical iron oxide
D: Needle-shaped titanium oxide
E: Spherical titanium oxide The present invention provides a magnetic recording medium which is excellent in electric properties in the short wave band and running property and which is suitable for digital recording media.

We claim:

1. A magnetic recording medium comprising;
   a non-magnetic support having provided thereon a plurality of layers including;
   a magnetic layer containing a ferromagnetic powder and a binder, wherein said ferromagnetic metal powder contains Fe, Al, and a rare earth element selected from the group consisting of Sm, Nd, Y, and Pr; and
   a non-magnetic layer provided between said magnetic layer and said non-magnetic support.

2. The magnetic recording medium of claim 1 wherein thickness of said magnetic layer is 0.02 to 0.6 μm and a thickness of said non-magnetic layer is 0.2 to 2.0 μm.

3. The magnetic recording medium of claim 1 wherein said nonmagnetic layer contains a needle-shape non-magnetic powder.

4. The magnetic recording medium of claim 1 a wherein said ferromagnetic metal powder contains 2 to 10 parts by weight of Al, and 1 to 8 parts by weight of said rare earth element, per 100 parts by weight of Fe.

5. The magnetic recording medium of claim 1 wherein a surface region of said ferromagnetic metal powder, having a thickness of not greater than 100 A contains 70 to 200 parts by number of Al atoms, and 0.5 to 30 parts by number of said rare earth element atoms per 100 parts by number of Fe atoms.

6. The magnetic recording medium of claim 1 wherein said ferromagnetic metal powder contains 2 to 10 parts by weight of Al, and 1 to 8 parts by weight of said rare element per 100 parts by weight of Fe, and
   a surface region of said ferromagnetic metal powder, having a thickness of not greater than 100 Å, contains 70 to 200 parts by number of Al atoms, and 0.5 to 30 parts by number of said rare earth element atoms, per 100 parts by number of Fe atoms.

7. The magnetic recording medium of claim 6 wherein said ferromagnetic metal powder further contains not more than 0.1 parts by weight of Na, and 0.1 to 2 parts by weight of Ca, per 100 parts by weight of Fe, and
   a surface region of said ferromagnetic metal powder, having a thickness of not greater than 100 A, further contains 2 to 30 parts by number of Na atoms, and 5 to 30 parts by number of Ca atoms, per 100 parts by number of Fe atoms.

8. The magnetic recording medium of claim 7 wherein said ferromagnetic metal powder further contains 2 to 20 parts by weight of Ni, and 0.3 to 5 parts by weight of Si per 100 parts by weight of Fe, and
   a surface region of said ferromagnetic metal powder, having a thickness of not greater than 100 A further contains not more than 0.1 parts by number of Co atoms, not more than 0.1 parts by number of Ni atoms, and 20 to 130 parts by number of Si atoms per 100 parts by number of Fe atoms.

* * * * *